Oct. 23, 1956     F. G. MOOREHEAD     2,767,581
FLOW METER
Filed Sept. 17, 1952
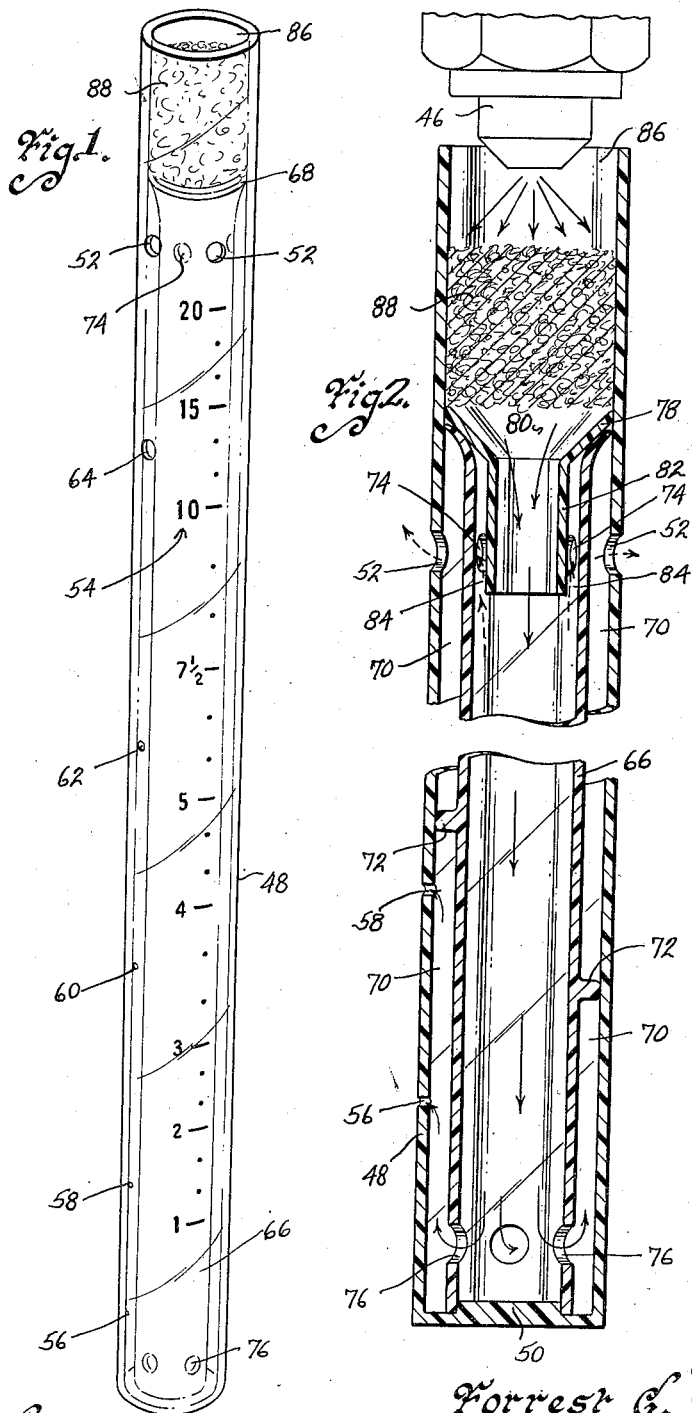
Witness
Edward P. Seeley
Inventor
Forrest G. Moorehead
by Talbert, Dick, & Adler
Attorneys

United States Patent Office 2,767,581
Patented Oct. 23, 1956

2,767,581

FLOW METER

Forrest G. Moorehead, Ida Grove, Iowa

Application September 17, 1952, Serial No. 310,061

6 Claims. (Cl. 73—215)

My invention relates to improvements in measuring the flow of liquid from a nozzle and is particularly adapted for use on weed spraying equipment.

The effective control and elimination of weed growths are of special concern to certain governing bodies in the care of road rights-of-way and maintenance thereof, and also to farmers in the raising of crops, and for this pupose special spraying equipment is produced by many different sources. In general, this equipment has substantially the same component parts and similar operating specifications relative to nozzle size, pressure and speed at which the equipment is moved. The farmer is concerned with the amount of gallons of solution that can be sprayed to the acre by a given operation in order that he can determine the chemical concentration in the solution to suit his particular purpose and needs. The potency of different chemical mixtures per gallon are well known and thus for effective control, the farmer must know the capacity of his equipment. To accommodate this need, nozzle manufacturers have converted the gallon per minute capacity of their nozzles into gallons per acre and have more or less standardized such sprayers by mounting the nozzle on a boom at twenty inch intervals with the boom calculated to move at four miles an hour. There are some structural differences in different nozzles as for example, one nozzle may be rated at five gallons per acre under thirty pounds pressure and another may have the five gallon rating but under forty pounds pressure.

It is of the utmost importance that such spraying equipment deliver its rated capacity, for the amount of chemicals used are coordinated with this capacity according to well known practices and consequently a failure to obtain the weed control anticipated, while often blamed on the chemicals, is more frequently due to faulty operation of the equipment. Such faults may not be readily discernible as often the solution discharged from the nozzle defines the same general pattern irrespective of the gallons per acre it is actually delivering, when this occurs, if the machine is functioning improperly, inefficient or drastic results are the signals that something is amiss. A worn orifice in the nozzle or one enlarged by cleaning with a piece of metal, a corroded orifice, dirty strainer, defective hose, corroded check valve or the like can substantially alter the rated capacity of the nozzle without the same being apparent to the eye. Consequently, the advantage of being able to measure the nozzle flow before spraying is obvious and is the problem which I have overcome.

Accordingly, therefore, the principal object of my invention is to provide a simple meter or gauge for measuring the flow of liquid from a nozzle such as used on weed spraying equipment and the like.

A further object of this invention is to provide a flow meter of the above class that need not be attached to the nozzle, but only placed to receive the fluid discharge therefrom.

A still further object of this invention is to provide a calibrated flow meter for measuring nozzle flow capacity where in the calibrations are arbitrarily determined for easy readability.

Yet another object of my invention is to provide a meter as set out above that measures fluid discharge under pressure from a nozzle and has means thereon to eliminate turbulence in the fluid and also accumulated air pressure therein prior to registering the rate of flow.

Still further objects of my invention are to provide a flow meter with the above mentioned characteristics that is light in weight, simple to use, economical in manufacture and efficient in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is an elevational view of a flow meter showing a preferred structure therefor embodying the principle of my invention, and Fig. 2 is an enlarged longitudinal section view of the device illustrated in Fig. 1.

Referring to the drawings the numeral 48 designates an outer vertical transparent tubular member preferably made of plastic or the like that is closed at the bottom and is provided on the inside bottom surface with a boss portion 50 that is concentrically smaller than the diameter of the tube 48 as shown in Fig. 2. Near the top of the tube 48 and extending around the same are the spaced apart transverse openings 52. Tubular member 48 is provided with vertically arranged measuring indicia or calibrations 54 that may be superimposed thereon by any suitable means and oppositely disposed on this tube from the calibrations I provide a plurality of vertically spaced apart apertures 56, 58, 60, 62 and 64 that provide outlet openings of different diameters, the same preferably being progressively larger from bottom to top but which may be of the same size as I will point out. The nozzle 46 represents any nozzle on weed spraying equipment from which it is desired to measure the rate of flow.

A second vertical tubular member 66, diametrically smaller than tube 48 and slightly less in length is removably arranged within tube 48 as shown in Fig. 1. The diameter of tube 66 should be such that the bottom portion provides a friction slip fit engagement around boss 50. The top of tube 60 is flared as at 68 so that it has a sealing engagement with the inner walls of tube 48 spaced below the top thereof and thus the boss 50 and flared top 68 serve as spacer means to maintain tube 66 spaced from tube 48 and thus provide the passageway or chamber 70 therebetween as shown in Fig. 2.

Additional boss-like spaced projections 72 may be formed on the outer side of tube 66 if required to assure uniformity in the size of chamber 70 throughout the length of tube 66. However, a more or less rigid material, if used for tube 66 will eliminate the need for projections 72. Preferably I use plastic for tube 66 and for better visibility and readability of the calibrations 54 it is suggested that tube 66 be colored to provide a non-transparent background. Openings 74 around the top of tube 66 are similarly arranged as openings 52 in tube 48 and on substantially the same horizontal plane. Near the bottom of tube 66 and just above the boss 50 I provide a plurality of spaced apart transverse openings 76 that extend around same as shown.

A funnel shaped insert 78 is removably mounted in the top of tube 66 and has the enlarged receiving chamber 80 and the reduced outlet portion 82. When so arranged the reduced outlet portion 82 is concentrically positioned within the upper portion of tube member 66 so that it extends slightly below the openings 74. Outlet 82 is diametrically smaller than tube 66 to provide the air passageway 84 that communicates with openings 74. It will be observed that by the arrangement of tube 66 and insert 78 as described, a receiving chamber 86 is formed at the top of tube 48 into which is removably placed a barrier member 88 of copper or brass wool or the like.

In operation tube 48 is preferably held in the hand with the receiving chamber 86 positioned as shown in Fig. 2 relative to the nozzle 46. Fluid discharged from the nozzle under pressure first passes through the metal wool 88 which destroys the turbulence in the spray pattern. Copper or brass wool, being rust resistant, is preferably used here although any other suitable material or means for accomplishing this purpose may be used, such as a perforated barrier plate or similar means for directing the fluid through a plurality of restricted passageways or a flexible porous mass that will provide a plurality of irregular passageways as the metal wool does. The fluid then passes through the restricted outlet 82 and any accumulated air pressure is relieved by flowing through the passageway 84 and out of the openings 72 and 52 to the atmosphere. The spray solution then passes down tube 66, out of openings 76 and rises in passageway 70 to seek an equilibrium so that a static reading is obtainable even though the fluid entered this meter under pressure. The openings 56, 58, 60, 62 and 64 are designed to permit the solution to be discharged from the tube 48 at levels which are marked to indicate predetermined gallons per acre flow capacity of the nozzle.

Since nozzle flow ratings for weed spraying equipment are in gallons per acre resulting from the more or less standardized mounting of the nozzles at twenty inch intervals on a boom moving four miles an hour, my calibrations read in gallons per acre and while I have preferably placed a twenty gallon limit on my meter, it may be adapted for greater or lesser nozzle capacities if desired.

It will be observed that in the construction of my new flow meter, the diameter of the tubes 48 and 66 is immaterial, but the size and number of the respective openings will vary depending upon the distance between the individual calibrations and this will become apparent from the following description of the method by which I constructed the device as shown. At the outset I decided to keep the number of fluid outlet openings at a minimum in order to simplify the operation, reduce the cost of production and at the same time provide an arbitrary exaggerated scale reading that would eliminate precision accuracy for differentiating between small variations in flow.

The calibrations 54 were predetermined by a one gallon to the acre nozzle, and an inch space on the tube 48 was arbitrarily selected as sufficient to exaggerate any small variation in a flow of such a small amount as one gallon per acre.

In order to have this device used as a continuous operation, openings 56, 58, 60, 62 and 64 on the tube 48 have holes of various sizes as decided so that the actual flow rates will read correctly at these predetermined calibrations. The first opening 56, for example, was provided with a one-sixteenth hole. The size of this hole was determined from a practical standpoint, and the position of the mounting was determined by trial and error so that the flow from a one gallon nozzle would coincide with a one gallon calibration. The position of the opening 56 was located as far below the arbitrarily selected one gallon calibration as possible so that the solution would be flowing out of this opening before the column of solution reached the maximum height, thus giving a continual flow which makes the reading more accurate and sensitive to variation.

The next opening 58 was placed by the same method and for the same reasons, with an orifice of the same size. The sum of the flow of these two openings allowed a satisfactory distance in the calibrations 54 up to five gallons an acre. The third opening 60 was placed below the ten gallons to the acre reading so that the solution will be flowing out of the opening before the ten gallon reading shows. When the solution passes the opening, it does not flow out due to the surface tension of the solution, but this is broken and the flow begins after the solution has raised a short distance in the tube above the outlet. When this flow starts, it drops the column momentarily, and for this reason the insert is mounted in this position to give a more accurate reading. The size of the hole in this opening 60 was determined by trial and error in order that the exact flow might coincide with the calibration and in the openings 62 and 64 the size and position were determined in the same manner.

It will be understood from the above description that any arbitrary form of calibrations can be selected for the tube 48 as for example the limit of such readings may be five, ten, one hundred or any other number selected. Obviously, on any meter tube of a given length, the lower the numerical limit on the calibrations, the farther apart would be the individual readings and vice versa. Then, by using a known flow rate for experiment, the number and size of openings can be determined so that levels in the tube at different flow capacities will correspond to the selected calibrations. Once this has been accomplished, the flow meter is substantially accurate in use as described.

Without regard to production costs, many varied combinations of differently placed openings with variations in diameter would produce an accurate reading for any given set of calibrations. For example, more openings in tube 48 than shown with smaller diameters, or less openings with larger diameters and differently placed could by experiment be positioned to serve the calibrations I have selected.

It will be appreciated that a meter calibrated and provided with openings as described for use with any given fluid under given conditions will not necessarily be usable for other fluids under the same or different condition.

However, having a known flow capacity for any flowable material, a suitable flow meter adapted for different viscosities can be made for use in like situations by following the teachings herein disclosed.

Results shown in the use of this flow meter that are at variance with the rated capacity of the nozzles tested may provide an accurate clue to the source of trouble. For example, a low reading on many nozzles may indicate a reduced pressure due to a faulty pump, and only one wrong reading out of several may indicate a particular nozzle needs cleaning or repairs. In any event, the actual flow capacity is asecertainable and this is important as it determines the chemical mixture that must be used to get the expected results.

This meter is used by merely holding it under a nozzle so that spray therefrom enters the chamber 86. In this way, many nozzles can be tested in a short time. It is appreciated that a plurality of these meters could be used to simultaneously test one spray machine with the meters having attaching means for holding them in place, and also drain traps could be provided for catching fluid discharged through the insert openings without departing from the principle of my invention. It will also be appreciated that while I have shown and described different modifications of my invention, that each operate upon the same principle and the modified forms illustrated have special significance chiefly with respect to economy in manufacture and shipping and in the availability of materials.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my flow meter without departing from the real spirit and purpose of my invention, and it is my intention to cover by my claims, any modified forms of structure or use of mechanical equivalents which may be reasonably included within their scope.

I claim:

1. In a flow meter, an elongated transparent vertical tubular member having a closed bottom and an open top, said open top serving as an inlet port, said tubular member provided with a transverse outlet opening intermediate its ends, a second elongated tubular member concentrically arranged within the first so that there is a passageway between the two which communicates with said outlet opening, the bottom of said second tubular member resting on the bottom of the first tubular member, the top of the second tubular member being flared to frictionally engage the first tubular member near said inlet, said second tubular member being provided with an outlet near the bottom thereof into said passageway, said first tubular member provided with calibrations, said flow meter adapted to receive a flow of fluid at said inlet port whereby the same passes through said second tubular member into said passageway and through the outlet in said first tubular member, and the size of the outlet in the first tubular member being arbitrarily determined to cause said fluid to seek a level in said passageway readable on said calibrations that correspond to a known rate of flow for said fluid.

2. In a flow meter, an elongated transparent vertical tubular member having a closed bottom and an open top, said open top serving as an inlet port, said tubular member provided with a plurality of vertically spaced apart transverse outlet openings intermediate its ends, a second elongated tubular member concentrically arranged within the first so that there is a passageway between the two which communicates with said outlet openings, the bottom of said second tubular member resting on the bottom of the first tubular member, the top of the second tubular member being flared to frictionally engage the first tubular member near said inlet, said second tubular member being provided with an outlet near the bottom thereof into said passageway, said flow meter adapted to receive a flow of fluid at said inlet port whereby the same passes through said second tubular member into said passageway and through one or more of the outlets in said first tubular member, and the size of the outlets in the first tubular member being arbitrarily determined to cause said fluid to seek different levels in said passageway as the volume of fluid passing therethrough varies, and said first tubular member provided with indicia whereby a known rate of flow of said fluid in indicated by the fluid level in said passageway.

3. In a flow meter, an elongated transparent vertical tubular member having a closed bottom and an open top, said open top serving as an inlet port, said tubular member provided with a transverse outlet opening intermediate its ends, a second elongated tubular member concentrically arranged within the first so that there is a passageway between the two which communicates with said outlet opening, the bottom of said second tubular member resting on the bottom of the first tubular member, the top of the second tubular member being flared to frictionally engage the first tubular member near said inlet, said second tubular member being provided with an outlet near the bottom thereof into said passageway, said first tubular member provided with calibrations, said flow meter adapted to receive a flow of fluid under pressure at said inlet port whereby the same passes through said second tubular member into said passageway and through the outlet in said first tubular member, means in said inlet for eliminating turbulence in said fluid so that it is in a static condition in said passageway and when moving through the outlet opening in the first tubular member, and the size of the outlet opening in the first tubular member being arbitrarily determined to cause said fluid to seek a level in said passageway readable on said calibrations that correspond to a known rate of flow for said fluid.

4. In a flow meter, an elongated transparent vertical tubular member having a closed bottom and an open top, said open top serving as an inlet port, said tubular member provided with a transverse outlet opening intermediate its ends, a second elongated tubular member concentrically arranged within the first so that there is a passageway between the two which communicates with said outlet opening, projections on the outer side of the second tubular member engageable with the inner side of the first tubular member to serve as spacer means in maintaining uniformity in the size of said passageway throughout its length, the bottom of said second tubular member resting on the bottom of the first tubular member, the top of the second tubular member being flared to frictionally engage the first tubular member near said inlet, said second tubular member being provided with an outlet near the bottom thereof into said passageway, said first tubular member provided with calibrations, said flow meter adapted to receive a flow of fluid at said inlet port whereby the same passes through said second tubular member into said passageway and through the outlet opening in said first tubular member, and the size of the outlet opening in the first tubular member being arbitrarily determined to cause said fluid to seek a level in said passageway readable on said calibrations that correspond to a known rate of flow for said fluid.

5. In a flow meter, an elongated transparent vertical tubular member having a closed bottom and an open top, said open top serving as an inlet port, said tubular member provided with a transverse outlet opening intermediate its ends, a second elongated tubular member concentrically arranged within the first so that there is a passageway between the two which communicates with said outlet opening, the bottom of said second tubular member resting on the bottom of the first tubular member, the top of the second tubular member being flared to frictionally engage the first tubular member near said inlet, said second tubular member being provided with an outlet near the bottom thereof into said passageway, said first tubular member provided with calibrations, said flow meter adapted to receive a flow of fluid under pressure at said inlet port whereby the same passes through said second tubular member into said passageway and through the outlet opening in said first tubular member, means in said inlet for eliminating turbulence in said fluid so that it is in a static condition in said passageway and when moving through the outlet opening in the first tubular member, said means comprising, a funnel shaped insert in said inlet, said insert having a diametrically reduced stub outlet extending into and concentrically spaced within the top portion of the second tubular member, a barrier member provided with a plurality of restricted passageways arranged in said inlet above said insert, said tubular members each having a respective opening near said stub outlet to provide an air passage outlet for air pressure accumulated in said fluid when passing through said barrier member and said insert, and the size of the outlet opening in the first tubular member being arbitrarily determined to cause said fluid to seek a level in said passageway readable on said calibrations that correspond to a known rate of flow for said fluid.

6. In a flow meter, an elongated transparent vertical tubular member having a closed bottom and an open top, said open top serving as an inlet port, said tubular member provided with a transverse outlet opening intermediate its ends, a second elongated tubular member concentrically arranged within the first so that there is a passageway between the two which communicates with said outlet opening, the bottom of said second tubular member resting on the bottom of the first tubular member, the top of the second tubular member being flared to frictionally engage the first tubular member near said inlet, said second tubular member provided with an outlet near the bottom thereof into said passageway, said first tubular member having calibrations, said flow meter adapted to receive a flow of fluid under pressure at said inlet port whereby the same passes through said second tubular member into said passageway and through the outlet in said first tubular member, a barrier member having a plurality of restricted passageways in said inlet for eliminating turbulence in said fluid as it passes therethrough, and the size of the outlet opening in the first tubular member being arbitrarily determined to cause said fluid to seek a level in said passageway readable on said calibrations that correspond to a known rate of flow for said fluid.

References Cited in the file of this patent

UNITED STATES PATENTS

| | | |
|---|---|---|
| 2,165,705 | Houser | July 11, 1939 |
| 2,281,512 | Reed | Apr. 28, 1942 |
| 2,479,786 | Stevens | Aug. 23, 1949 |